United States Patent [19]

Lund

[11] Patent Number: 4,784,327
[45] Date of Patent: Nov. 15, 1988

[54] YARD STATION

[76] Inventor: Arlyn L. Lund, Box 100, Anita, Iowa 50020

[21] Appl. No.: 137,334

[22] Filed: Dec. 23, 1987

[51] Int. Cl.[4] ............................................. A01D 75/00
[52] U.S. Cl. ................................... 239/276; 239/444; 239/DIG. 6; 56/12.1; 56/16.8
[58] Field of Search ................. 56/12.1, 17.5, DIG. 5, 56/320.2, 16.8, 16.9, 16.7; 239/566, 444, DIG. 6, 289, 526, 273, 275, 285, 276; 134/198, 199

[56] References Cited

U.S. PATENT DOCUMENTS

| | | | |
|---|---|---|---|
| 2,936,563 | 5/1960 | Blume | 56/12.1 |
| 3,040,990 | 6/1962 | Gotti | 56/12.1 |
| 3,108,608 | 10/1963 | Mahowald | 134/198 |
| 3,214,893 | 11/1965 | Griffin | 56/12.1 |
| 3,322,347 | 5/1967 | Pierce | 239/289 |
| 3,490,212 | 1/1970 | Hengesbach | 56/16.8 |
| 3,535,862 | 11/1970 | Whittwer | 56/17.5 |
| 3,539,106 | 11/1970 | Ramik | 239/566 |
| 3,856,028 | 12/1974 | Kehler | 239/DIG. 6 |

*Primary Examiner*—Paul J. Hirsch
*Assistant Examiner*—Vincent Ciamacco
*Attorney, Agent, or Firm*—James D. Welch

[57] ABSTRACT

A substantial, stable, safe to use yard station is disclosed. The yard station provides for the cleaning of lawn mowers, both the underside and outer surface, and of other lawn implements. The construction is from a relatively heavy gauge base plate, which has provision for staking the apparatus down, and from water carrying pipe fittings, valves, a length of hose and a nozzle etc.

2 Claims, 1 Drawing Sheet

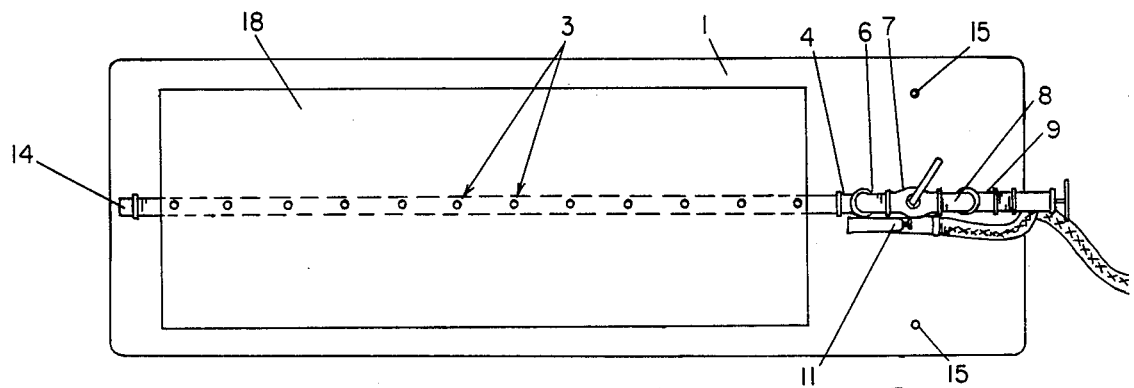
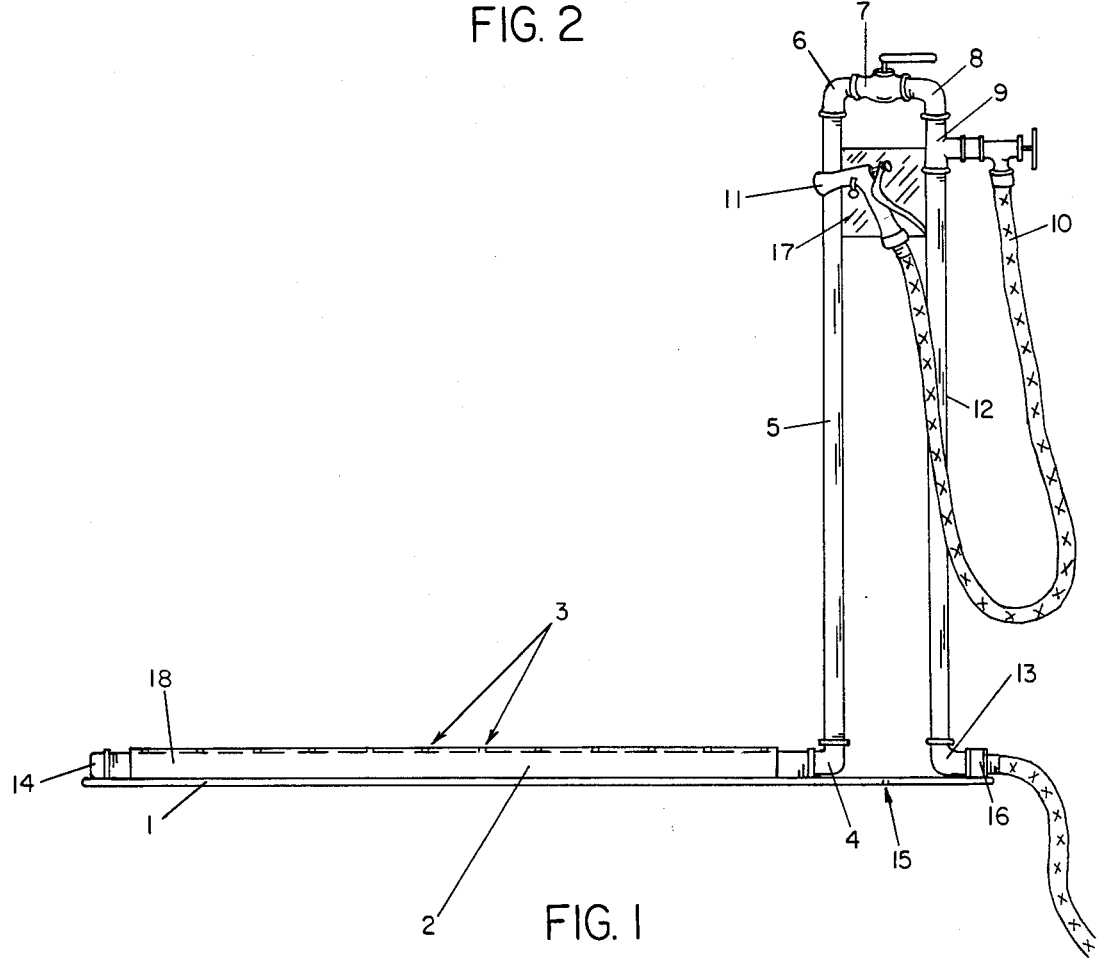
FIG. 2
FIG. 1

YARD STATION

The invention in this application is subject in Disclosure Document Number 175,029.

TECHNICAL FIELD

This invention relates to lawn mower and implement cleaning apparatus, and in particular to a stable and substantial device which is safe, convenient and easy to use.

BACKGROUND

Everyone who gardens or mows grass is very much aware that garden implements and mowers become dirty, and clippings build up on the underside of mowers. The average person does his best to clean the dirt from implements and mowers, and clippings from the underside of mowers by using a hose and scraping tools. To aid with the effort inventors have created devices which, for instance, become part of mowers, and provide for the attachment of a hose to a mower so that water can be injected into the undercarriage while the mower is still running. The problem with such attachments is that they become clogged with grass and debris and require frequent cleaning. Examples of such inventions are found in U.S. Pat. No. 3,535,862 to Whitter and U.S. Pat. No. 3,040,990 to Gotti for instance. Other inventors have created mobile assemblies which can be placed under a mower and which can direct water upward to cause a similar result. See U.S. Pat. No. 3,108,608 to Mahowald and U.S. Pat. No. 3,322,347 to Pierce for instance.

While the cited patents attach the problem of cleaning the underside of mowers, they do not provide a convenient means to clean the outer surface of a mower or other implements, or a volume of water sufficient to discharge large amounts of grass clippings and other debris, especially from larger mowers. In addition, the patents cited emphasise mobility of the apparatus, and as a result, are not particularly stable and substantial. The possibility of injury occuring when using such light weight products can not be dismissed. A need exists for a safe to use, stable and substantial apparatus to aid with the cleaning of the underside of mowers in addition to implements such as shovels, rakes, hoes etc. and the outer surface of mowers. The apparatus meeting the need should be suitable for semi-permanent mounting at a convenient location in a yard.

DISCLOSURE OF THE INVENTION

The need identified in the Background section is met by the present invention.

The present invention comprises a relatively heavy horizontal base which serves as a stabilizor, and which provides holes through the which the unit can be staked down, to which is attached water carrying pipes, fittings and valves. The water carrying apparatus comprises a pipe with holes along one side thereof which is attached, with the holes pointing upward, to the horizontal base plate. The holes in the water carrying pipe can be made larger at the ends of the pipe, and be oriented so that water exits them at an outward angle. This arrangement is useful when large mowers are cleaned. The water carrying pipe is closed at its far end, and attached to a 90 Degree fitting at the other. A vertical pipe extends from the 90 Degree fitting approximately three feet to a connection with a valve assembly. The valve assembly provides means for controlling water access to the pipe with holes along one side thereof, and also provides means for controlling access of water to a separate hose and hand operated nozzel. The control valve assembly is placed at a convenient hieght for use by a person who drives a riding lawn mower onto the invention, and for use by one who pushes a push mower onto the invention and wishes to operate the valves while remaining close to the push mower's controles.

Additional piping runs from the valve assembly to a connection at which a garden hose can be attached.

The invention provides a convenient apparatus for cleaning the underside of a mower which is placed atop the apparatus, and additionally provides for the simultaneous cleaning of the top of the mower, and other garden implements. The invention, being relatively heavy and stable, and providing holes through which it can be staked to the ground, is safe to use. In addition to the safety aspects, the invention is also designed to provide sufficient amounts of water to clean large mowers and other implements without beccoming clogged. The invention can be constructed from metal and/or plastic materials.

SUMMARY OF THE INVENTION

Anyone whoe does gardening or lawn mowing understands that lawn implements and mowers become dirty and clogged with clippings etc. Inventors have created inventions which attach to lawn mowers to provide water to the underside thereof, and portable apparatus which serves a similar function when a mower is placed atop same. Prior inventions, however, do not provide for the cleaning of the top of a mower, or other implements simultaneously. Prior inventions also stress their light weight portable construction. In view of prior inventive activity in the general area, there appears a need for a stable, substantial apparatus for use in the cleaning of the underside and outer surface of lawn mowers and/or garden implements simultaneously. The present invention meets the need.

BRIEF DESCRIPTION OF THE DRAWINGS

FIG. 1 is a side elevational view of the invention.
FIG. 2 is a top view of the invention.

DETAILED DESCRIPTION

Referring now to FIG. 1, there is shown a base plate (1). FIG. 2 shows holes (15) in base plate (1) to allow staking it down for stability and safety purposes. To base plate (1) is attached a pipe (2), which pipe has holes (3) therein which are directed upward, and which pipe is closed at one end by plug (14) and attached to a 90 Degree fitting (4) at the other end. From the 90 Degree fitting (4) is extended a pipe (5) which attaches at its far end to a second 90 Degree fitting (6), valve (7) and third 90 degree fitting (8). Attached to the third 90 Degree fitting (8) is a second valve (9), to which a hose (10) and hand operated nozzel (11) attach in succession. From the second valve (9) a third pipe (12) extends vertically downward to a connection with a fourth 90 Degree fitting (13), which fitting is secured to the base plate (1), and which attaches to a hose connector fitting (16), by which the invention can be attached to a source of water accessed through a garden hose or pipe arrangement. Between pipes (5) and (12) a plate (17) can be mounted to add strength and to provide a mounting on which the hand nozzel (11) can be hung. A ramp cover

(18) is also provided to protect the pipe (2) against damage during use.

Also note that the holes (3) in pipe (2) can be directed so as to spray water at other than a vertical angle.

Having hereby disclosed the subject matter of this invention, it should be obvious that many modifications, substitutions and variations of the present invention are possible in light of the teachings. It is therefore to be understood that the invention may be practised other than as specifically described, and should be limited in breadth and scope only by the claims.

I claim:

1. A stable, substantial apparatus for use in the cleaning of lawn implements and mowers, which apparatus comprises a horizontal base plate with holes therein to allow staking the apparatus to the ground; a pipe with holes along one side thereof, with a plug in one end, which pipe is attached to the top of the horizontal base plate so that the holes in the pipe face upward, and which pipe, at the other end thereof is attached to a pipe fitting which in turn attaches to a vertical pipe, which vertical pipe extends approximately three feet vertically to a connection, via fittings, with a valve assembly, which valve assembly provides means for controlling the access of water to the pipe with holes along one side thereof, and to a seperate hose and hand operated nozzel; which valve assembly attaches to a pipe, via fittings, which pipe extends downward vertically to a connection with the horizontal base plate and a connection which is suitable for attachment to a source of water such as a hose.

2. A stable substantial apparatus for use in the cleaning of lawn implements and mowers, as in claim 1, which further comprises a plate mounted between the vertical pipes, which plate contains a mounting for hanging the hand operated nozzel thereon; and a ramp cover which sits atop of the horizontal base plate to protect the pipe with holes along one side thereof.

* * * * *